United States Patent
Manich et al.

(10) Patent No.: US 6,520,472 B1
(45) Date of Patent: Feb. 18, 2003

(54) CONTAINER RESTRAINT FOR A PARKED SWAP BODY

(75) Inventors: Glenn R. Manich, Mequon, WI (US); Reinhard E. Sander, Milwaukee, WI (US); Robert J. Harter, LaCrosse, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 09/235,430

(22) Filed: Jan. 22, 1999

(51) Int. Cl.[7] ............. A47F 5/00; E04G 25/00; F16M 13/00
(52) U.S. Cl. ............. 248/351; 410/61; 410/63
(58) Field of Search ............. 248/351, 352; 410/54, 56, 58, 61, 63, 94; 414/402, 584, 461

(56) References Cited

U.S. PATENT DOCUMENTS

| | | | | |
|---|---|---|---|---|
| 3,180,282 A | * | 4/1965 | Gutridge | 410/61 |
| 3,188,982 A | * | 6/1965 | Bergen | 410/61 |
| 3,189,307 A | * | 6/1965 | Peterson | 410/61 |
| 3,235,211 A | * | 2/1966 | Robinson | 410/61 |
| 3,289,987 A | * | 12/1966 | Candlin, Jr. | 410/61 |
| 3,337,170 A | * | 8/1967 | Remy | 410/61 |
| 3,490,723 A | * | 1/1970 | Atkinson | 410/63 |
| 3,606,219 A | * | 9/1971 | Hammonds | 410/63 |
| 4,718,800 A | | 1/1988 | Engle | 410/61 |
| 5,203,663 A | | 4/1993 | Ruppe | 414/401 |
| 5,601,030 A | * | 2/1997 | Brouillette | 410/53 |

FOREIGN PATENT DOCUMENTS

| | | |
|---|---|---|
| WO | WO 88/08403 | 11/1988 |

OTHER PUBLICATIONS

*International Search Report* concerning International Patent Application Ser. No. PCT/US00/01173, European Patent Office, dated Sep. 5, 2000, 7 pages.

* cited by examiner

*Primary Examiner*—Leslie A. Braun
*Assistant Examiner*—Gwendolyn Baxter
(74) *Attorney, Agent, or Firm*—Marshall, Gerstein & Borun

(57) ABSTRACT

A restraint for a parked swap body container includes a face stop that can be selectively positioned to a restraining position and a release position. In the restraining position, the face stop is adapted to engage a front face of the container to limit the extent to which the parked container can move away from an edge of a truck loading dock. In The release position, the face stop allows a truck to remove the container from the loading dock. The restraint may also include a frame that can be repositioned longitudinally to accommodate containers of various lengths. A fine adjustment can be added to further limit horizontal movement of the container. And an optional bottom support could engage the bottom of the container to provide even more support.

6 Claims, 6 Drawing Sheets

CONTAINER RESTRAINT FOR A PARKED SWAP BODY

BACKGROUND OF THE INVENTION

1. Field Of The Invention

The subject invention generally pertains to swap body containers, and more specifically, to a device that restrains a parked swap body container.

2. Description Of Related Art

A swap body is typically a large freight container having four retractable legs. The legs are usually retracted while the swap body is in transit on the bed of a truck, trailer, ship, or rail car. When parked at a truck loading dock, the legs are typically extended to support the container upon a driveway with the floor of the container generally aligned flush to the floor of the loading dock. This allows a forklift to drive into the container for loading or unloading, yet allows the truck that delivered the container to leave.

While the legs provide a vertical/columnar support for the weight of the container and its contents (and material handling equipment), the legs are not designed to resist substantial horizontal forces. Substantial horizontal forces, however, can be exerted on the legs. For example, if the forklift inside the container was to suddenly stop by applying the brakes or striking cargo, the horizontal reaction force would be transmitted to the container's legs. Since a forklift can weigh thousands of pounds, and given the relative instability of the legs to resist horizontal movement, it is possible that an abrupt stop or collision could cause the container to move horizontally away from the dock, opening up a potentially hazardous gap between the container and the dock. Further, such horizontal movement could place a torque or bending force on one or all of the legs, causing them to buckle, or fold up, or (in a worst-case scenario) to collapse altogether. Such an accident might seriously harm the forklift operator, others nearby, the cargo or surrounding structure.

One means for restraining a truck trailer atop a railroad car is disclosed in U.S. Pat. No. 4,718,800. The device includes a support plate (item 18) for engaging a kingpin that extends out from underneath the bottom of the trailer. The support plate is rather wide, possibly to accommodate a slot having a wide lead-in for catching a kingpin that may be disposed substantially off-center or difficult to see, and thus, possibly difficult to align to the slot. Moreover, with the kingpin being underneath the container, it may be difficult to visually confirm that the pin is fully engaging the plate. Of course, such a device also relies upon the presence of a kingpin to properly operate.

SUMMARY OF THE INVENTION

In order to minimize undesirable horizontal movement of a swap body, there is provided a restraint for a parked swap body container that includes a face stop that can be positioned to a restraining position or a release position relative to the front face of the container. In the restraining position, the face stop is adapted to engage a front face of the container to limit the extent to which the parked container can move away from an edge of a truck loading dock. In the release position, the face stop allows movement of the container, for example to allow a truck to remove the container from the loading dock.

Such a restraint helps keep a swap body container from slipping too far away from the edge of the dock, thereby possibly avoiding creating a hazardous gap between the container and the edge of the loading dock and the related undesirable forces on the legs that could lead to their failure.

In some embodiments, the restraint is able to be removed to a location that is completely out of the way for delivering and removing a swap body from a loading dock, or possibly for facilitating snow removal of the loading dock's driveway.

Some embodiments also include a fine adjustment which is advantageous in further limiting the extent to which a parked swap body container could otherwise move away from the loading dock.

DESCRIPTION OF THE PREFERRED EMBODIMENT

Figure 1:
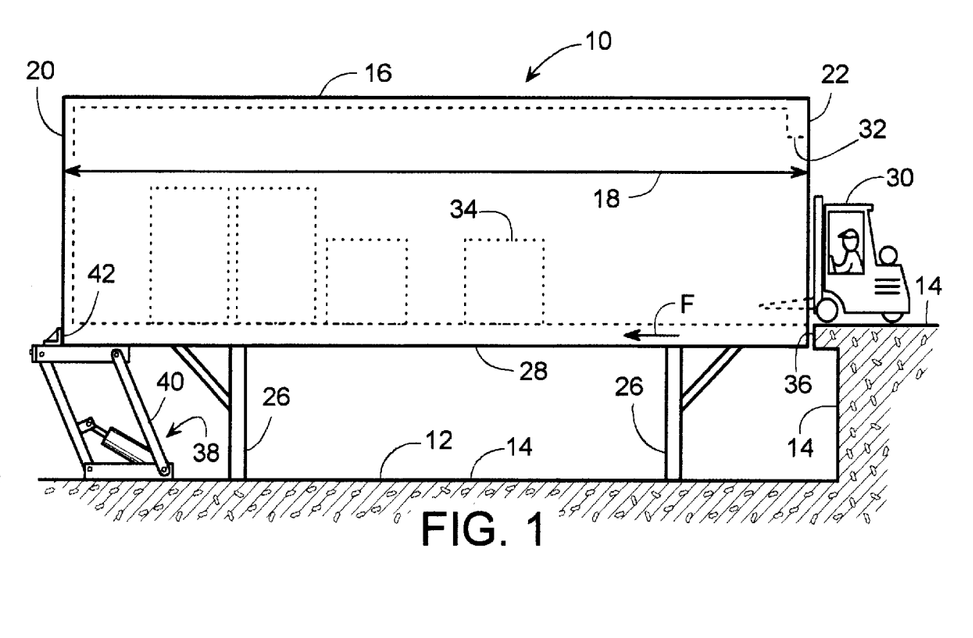
FIG. 1 is a side view of a restraint engaging a swap body container that is parked at a loading dock.
Figure 2:
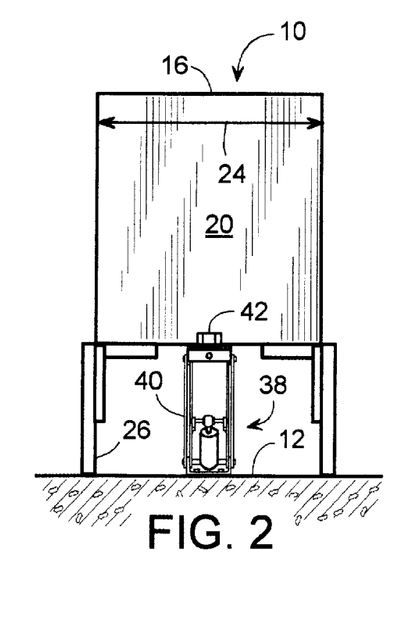
FIG. 2 is a left end view of FIG. 1.

FIGS. 1 and 2, respectively, show a side and front view of a swap body 10 parked upon a driveway 12 of a truck loading dock area 14. Swap body 10 is primarily a relatively large freight container 16 whose length 18 from a front face 20 to a rear face 22 may exceed 23 feet and whose width 24 may be about 8 feet or more. Swap body 10 typically includes four legs 26 that can extend downward to support the weight of container 16 when parked. However, when swap body 10 is in transit on, for example, the trailer bed of a truck, legs 26 are typically repositioned for storage by being folded up underneath a bottom 28 of container 16. When a truck delivers swap body 10 to loading dock area 14, extending legs 26 allows the truck to leave, while container 16 may be loaded or unloaded by a forklift 30 through a user access 32.

Movement of lift truck 30 inside the container, particularly quick stops and quick starts, results in forces F (FIG. 1) being exerted on the container. As legs 26 support container 16 in place, these forces F are transmitted to the legs, and can lead to torques and stresses within the legs that could lead to their failure. Use of a container restraint as disclosed herein helps support the container to minimize its movement away from the dock, and thus minimize harmful stresses on the legs. Accordingly, this problem is minimized by providing a restraint that limits the movement of container 16 away from an adjacent structure such as a loading dock by engaging a front surface of the container.

Figure 3:
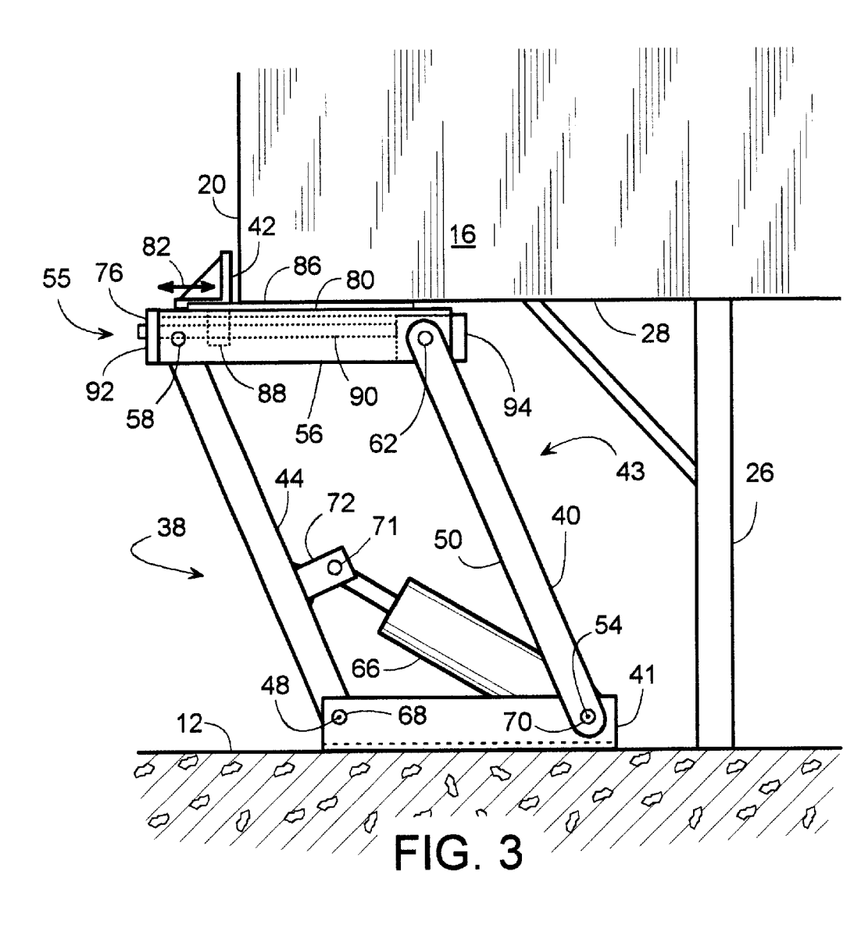
FIG. 3 is a more detailed side view of the restraint of FIG. 1.
Figure 4:
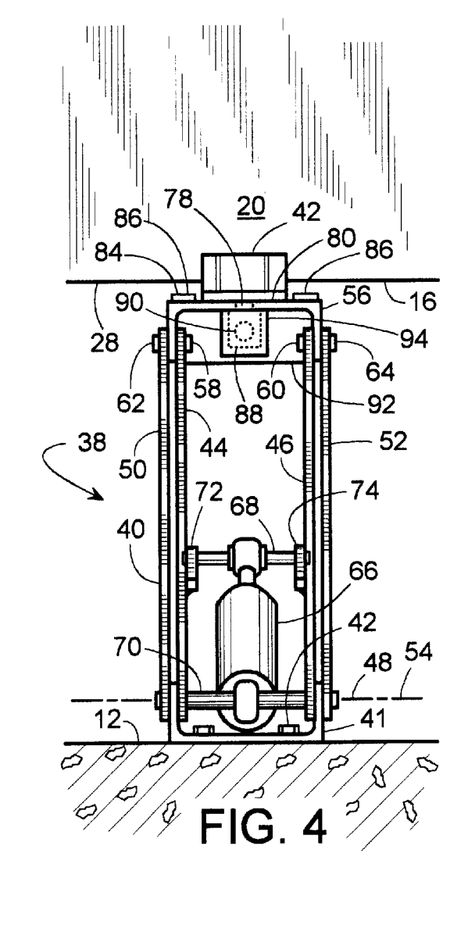
FIG. 4 is a right end view of FIG. 3.

An example of such a restraint is shown in FIGS. 3 and 4. Here, a restraint 38 is provided with a base such as, for example, a channel 41 anchored to driveway 12 by way of anchor bolts. To prevent horizontal movement of the container 16, a face stop 42 is coupled to the base or channel 41 so as to be movable between a restraining position (wherein the face stop 42 is disposed adjacent face 20 of container 16 to prevent or impede movement thereof) and a release position (wherein face stop 42 is disposed to not impede movement of face 20). The coupling between face stop 42 and base 41 is such that face stop 42 can be secured or locked into the restraining position.

Figure 5:
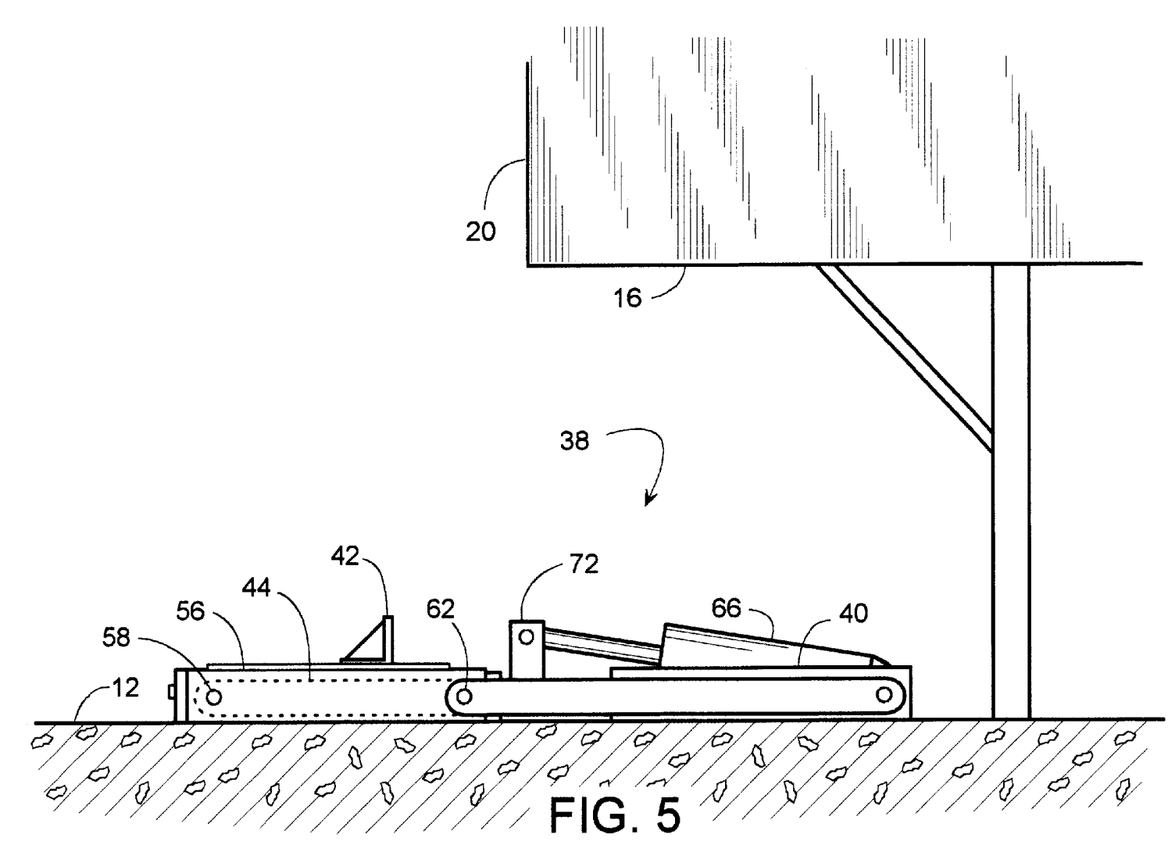
FIG. 5 is a side view of the restraint of FIG. 3, but with the restraint in its release position.

While a face stop according to one embodiment could be directly coupled to the base (see FIG. 8, for example), the exemplary restraint according to FIGS. 3-5 shows the face stop 42 coupled to the base 41 through additional components. In particular, an engaging assembly 55 is provided, which includes face stop 42. Engaging assembly 55 also includes a bottom support such as channel 56, upon which face stop 42 is preferably mounted for movement, as discussed in greater detail below. Bottom support 56 also advantageously engages and supports a bottom surface 28 of container 16 when the restraint is in the restraining position, helping to give enhanced vertical stability and collapse-prevention to container 16.

The coupling of face stop 42 to base 41 is achieved by virtue of engaging assembly 55 being mounted for movement relative to base 41 through a movable assembly 43. In the restraint of FIGS. 3–5, the movable assembly is a linkage comprising arms 44, 46, 50 and 52, each of which are pivotally mounted both to the engaging assembly 55 and to base 41. At base 41, arms 44 and 46 pivot together as a pair about a common axis 68, while arms 50 and 52 also pivot as a pair about another common axis 70. The upper ends of arms 44, 46, 50 and 52 are pivotally coupled to engaging assembly 55 at pivot points 58, 60, 62 and 64 respectively. The arms are of generally the same length and pivot in unison with each other to raise and lower engaging assembly 55 in an attitude that is generally level or parallel to base 41. This allows face stop 42 and bottom support 56 to remain generally square to container 10, as assembly 43 lifts assembly 55 to the restraining position.

In one embodiment, movable assembly 43 is moved by a powered actuator, such as a fluid actuated cylinder 66 (e.g., hydraulic or pneumatic). In this restraint, cylinder 66 extends between lower axis 70 and an upper shaft 71. It should be appreciated, however, that cylinder 66 can be mounted in other configurations that can also forcibly pivot the arms of assembly 43. For example, cylinder 66 can be mounted in a configuration similar to that of a manual jack 108 shown in FIG. 6. Also, instead of a cylinder, other actuators or manual power could be used. Cylinder 66, however, has an additional benefit of being lockable in an extended position, and thus also serves to lock face stop 42 in place relative to base 41 to further provide a restraining function.

While face stop 42 could be fixed relative to bottom support 56, here an adjustment 76 advantageously mounts stop 42 for horizontal movement. Varying lengths of swap bodies could mean that a non-adjustable stop 42 could be significantly displaced from front face 20 even when in the restraining position. So the horizontal adjustment provides a way of "snugging up" or taking up the gap that might otherwise exist between stop 42 and the face of various length containers. In one embodiment, a lead screw 90 driving a nut 88 provides the horizontal adjustment. Nut 88 extends through a slot 78 to attach to face stop 42. Lead screw 90 is rotatably supported by a bearing plate 92 at one end and driven at an opposite end by a drive 94, such as a motor (e.g., hydraulic, pneumatic or electric). Drive motor 94 rotating screw 90 moves nut 88 to feed stop 42 linearly in a direction that depends on the motor's direction of rotation. Guide tracks 86 can be added to further guide the movement of stop 42 along bottom support 56.

It should be appreciated by those skilled in the art, that the foregoing description of adjustment 76 is just one of many mechanisms available to adjust stop 42 relative to frame 40. Therefore, adjustment 76 has been schematically illustrated to encompass those other mechanisms, examples of which would include, but not be limited to: manual actuators, hydraulic or pneumatic cylinders, linear ratchets, discrete repositionable stops, and various clamping devices. Moreover, it is well within the scope of invention to incorporate the adjustment anywhere from stop 42 to driveway 12 such as, for example, at an interface where frame 40 engages driveway 12.

In the operation of restraint 38, cylinder 66 extends to lower engaging member 55 down to a release position, possibly all the way down against driveway 12, as shown in FIG. 5. The low profile provides enough vertical clearance to allow a truck carrying a swap body to pass over restraint 38 with the truck's right and left wheels straddling each side. After the truck positions swap body 10 at loading dock 14, legs 26 are extended downward to a position to support container 16 upon driveway 12. Once swap body 10 is self-supported, the truck can depart the loading dock area. Cylinder 66 then retracts to pull the four arms of linkage assembly 43 back to a more upright position. This raises face stop 42 (here carried on engaging member 55) to a restraining position where channel 56 or track 86 engages the underside of container 16, as shown in FIG. 3 and 4. Should a gap result between face stop 42 and front face 20, adjustment 76 can drive stop 42 against face 20 to close the gap, and thus more firmly restrain container 16. After container 16 is safely loaded or unloaded, it can be released by cylinder 66 once again lowering engaging member 55 back down to its release position, as shown in FIG. 5.

Figure 6:
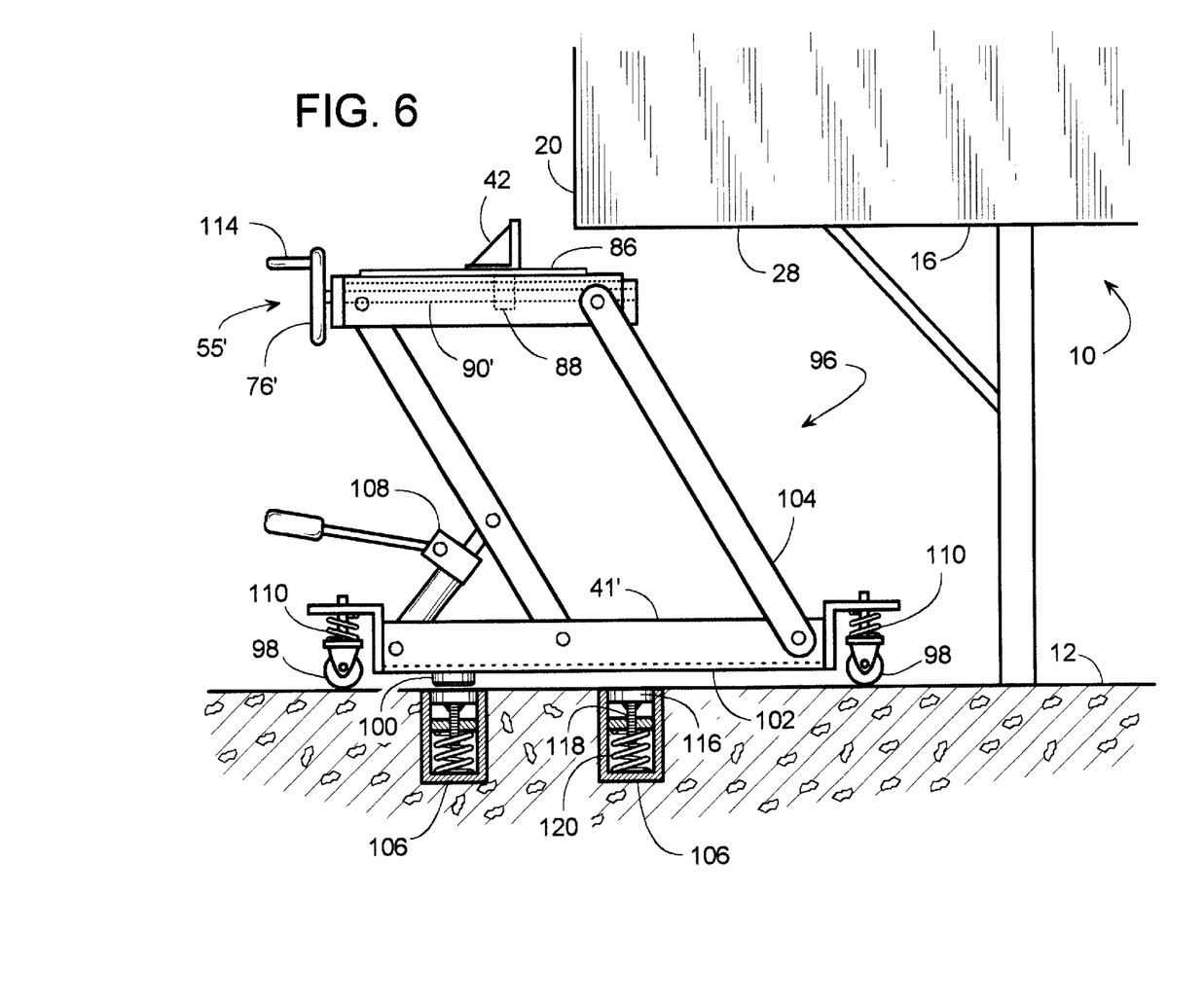
FIG. 6 is a side view of another embodiment with a restraint in its release position.
Figure 7:
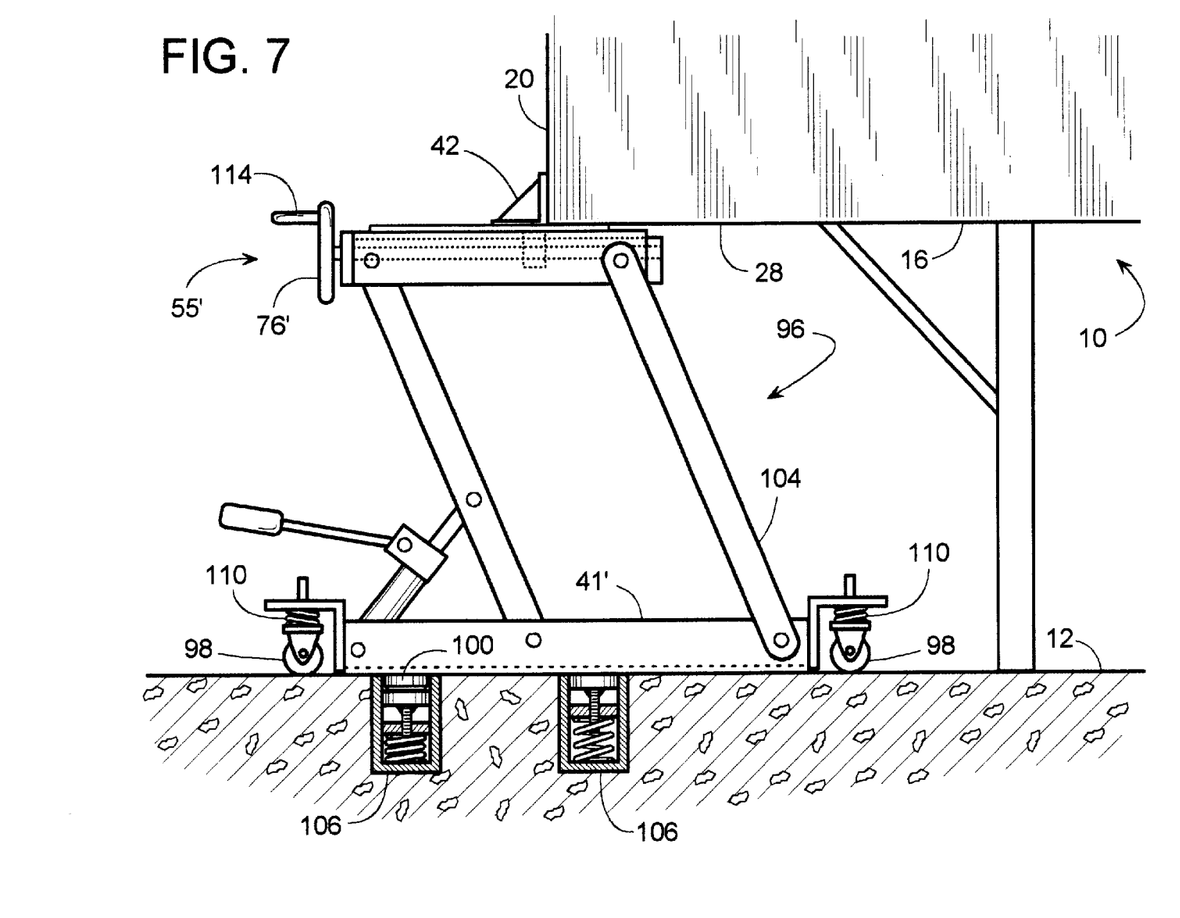
FIG. 7 is a side view of the restraint of FIG. 6, but with the restraint in its restraining position.

In a closely related embodiment, shown in FIGS. 6 and 7, a restraint 96 includes a mobile base 41' that is mountable to driveway 12. However, retractable swivel casters 98 extending below a bottom surface 102 of base 41' also allow restraint 96 to be moved in a lateral direction across driveway 12. This allows restraint 96 to be removed from the area, so it presents no impediment to a truck delivering or removing swap body 10. It also allows a single restraint to be used at several positions within one dock area to accommodate swap bodies of various lengths, or even moved to another dock area altogether.

One possible way of temporarily fixing restraint 96 to driveway 12 to allow it to perform its restraining function is by having a plug 100 protrude below surface 102 of restraint 96, so that it extends into a socket 106 imbedded in driveway 12. In this exemplary embodiment, casters 98 normally extended by springs 110 support base 41' to elevate plug 100 above the top surface of driveway 12. This allows positioning of restraint 96 (without plug 100 dragging against the driveway) to align plug 100 to a socket 106. Once aligned, an actuator, e.g., manually operated jack 108, pivots arms 104 to raise an engaging assembly 55' up against container 16. Continued jacking of assembly 55' up against the bottom of container 16 forces base 41' downward against the surface of driveway 12. The forced downward motion of base 41' overcomes springs 110 to retract casters 98 and force plug 100 into socket 106, as shown in FIG. 7.

If a gap remains between face stop 42 and the front face of container 16 after restraint 96 is in its restraining position (e.g., base 41' is fixed relative to driveway 12), the gap can be reduced or eliminated by an adjustment assembly 76.' In this restraint, adjustment 76' includes a manually operated crank 114 that operates a screw and nut combination (e.g., screw 90' and nut 88) for feeding stop 42 in a manner comparable to that of adjustment 76. Further, the horizontal positioning of face stop 42 could be carried out in a variety of other ways, such as those already discussed with reference to adjustment 76.

To return restraint 96 to its release position, jack 108 is retracted until base 41' lifts plug 100 out of socket 106, so restraint 96 can be rolled laterally clear of container 16. By moving face stop 42 laterally to its release position and clear of container 16, restraint 96 does not necessarily have to collapse all the way down to driveway 12 in order for a truck to have access to deliver or remove container 16. It should be appreciated by those skilled in the art, that although a pivoting style lifting mechanism is used to position face stop 42 in its restraining position, other mechanisms or structure could be employed such as, for example, mounting a face stop on a conventional wheeled trailer jack releasably lockable to driveway 12.

As an option, in FIG. 6, socket 106 can be shielded by a sliding plunger 116 to help keep dirt from entering socket 106. In this example, a threaded adjustment 118 helps align plunger 116 flush with driveway 12, while a compression spring 120 allows plug 100 to still protrude into socket 106.

Figure 8:
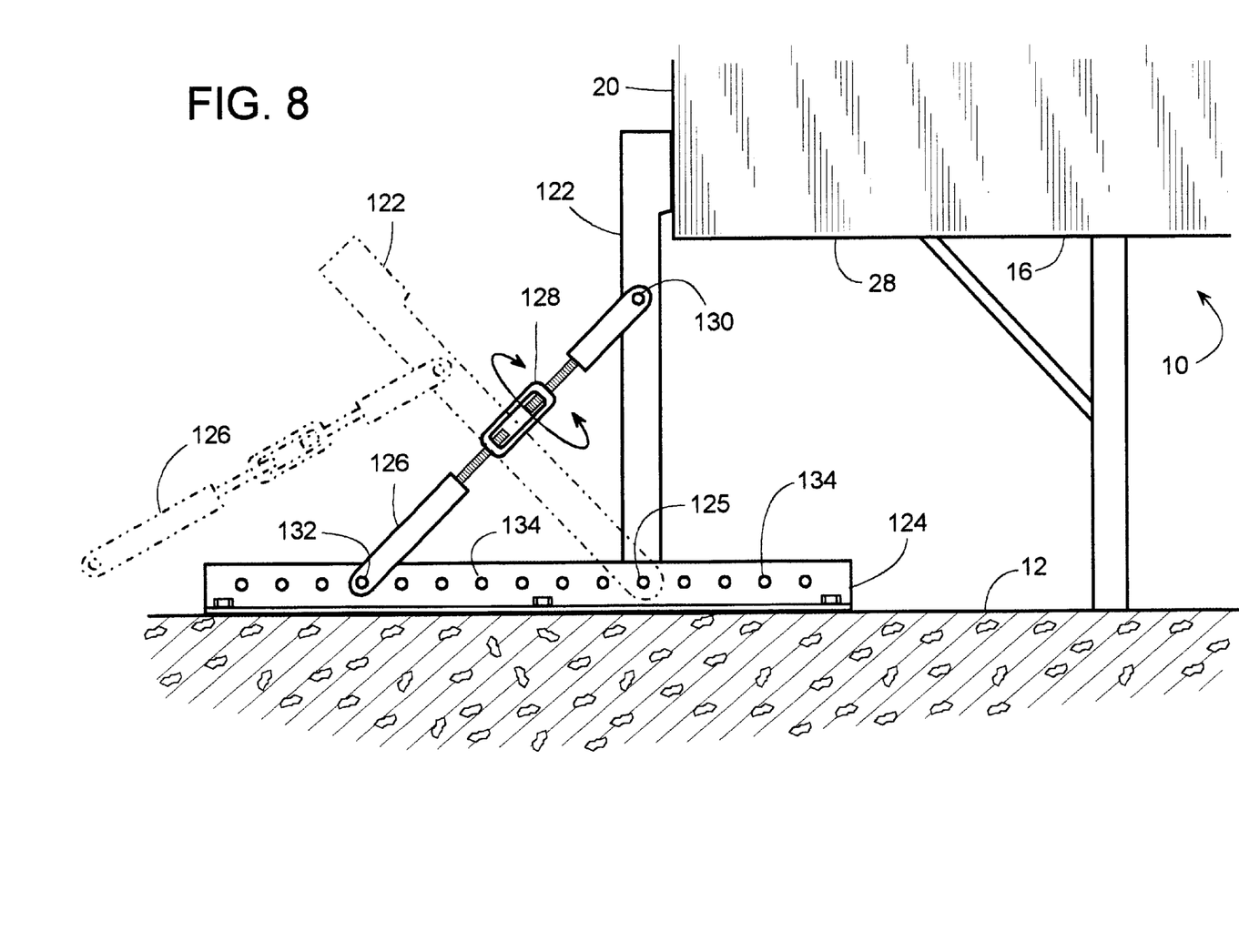
FIG. 8 is a side view of another restraint embodiment.

In another embodiment, shown in FIG. 8, container 16 is restrained by a pivoting face stop 122 that is directly coupled to a base 124 anchored to driveway 12. To restrain or release container 16, face stop 122 pivots about a pin 125 that attaches face stop 122 directly to base 124. In the restrain position, a brace 126, attached to face stop 122 (either the front or back) and base 124 by way of pins 130 and 132 respectively, holds face stop 122 generally up against face 20 of container 16. Any gap remaining between stop 122 and face 20 can be taken up by an adjustment 128, such as, for example, a turnbuckle that varies the length of brace 126 between its mounting pins 130 and 132. Other examples of adjustment 128 would include, but not be limited to, lead screws, hydraulic or pneumatic cylinders, linear ratchets, discrete repositionable stops, and various manual actuators or adjustable clamping devices. Of pins 130 and 132, at least one is preferably made readily detachable or disengagable to allow face stop 122 to be quickly raised and lowered between its restrain and release position. In one exemplary embodiment, a series of holes or detents 134 provides a selection of locations at which pins 125 and 132 can be positioned to accommodate containers of various lengths.

To release container 16, detachable pin 132 allows stop 122 and brace 126 to swing down and clear of container 16. The pivoting motion can be performed manually or powered by some conventional actuator, such as those already discussed.

It should be noted that each restraint shown herein could also be provided with a means for sensing when the restraint is in a restraining position. Appropriate visual signals (red and green lights, etc.) or audio signals could be connected to this sensing means to give dock personnel, drivers and the like appropriate indications that the swap body either is or is not properly restrained from movement.

Although the invention is described with respect to a preferred embodiment, modifications thereto will be apparent to those skilled in the art. Therefore, the scope of the invention is to be determined by reference to the claims that follow.

We claim:

1. A restraint for limiting movement of a swap body in a parked position, the swap body having a length extending along a longitudinal direction and a width extending along a lateral direction, the swap body including a container having a front face and a rear face at opposite ends of the length and extending upwardly from a bottom of the container, the direction from the rear face to the front face defining a first direction, the swap body also including a plurality of legs coupled to the container and adapted to rest upon a driveway to support the container above the driveway in the parked position, the restraint comprising:

a frame adapted to be coupled to the driveway, with the frame being moveable in the lateral direction;

a first axis associated with the frame;

a bottom support coupled to the frame and adapted to engage the bottom of the container;

a face stop coupled to the frame and selectively positionable to a restraining position and a release position, in the release position the face stop being adapted to accommodate delivery and removal of the swap body respectively to and from the driveway, in the restraining position the face stop being adapted to engage the front face to limit horizontal movement of the container in the first direction, the face stop being positionable to the restraining position and the release position by virtue of the frame being movable in the lateral direction; and a fine adjustment that repositionably couples the face stop to the bottom support.

2. A restraint for limiting movement of a swap body in a parked position, the swap body having a length extending along a longitudinal direction and a width extending along a lateral direction, the swap body including a container having a front face and a rear face at opposite ends of the length and extending upwardly from a bottom of the container, the direction from the rear face to the front face defining a first direction, the swap body also including a plurality of legs coupled to the container and adapted to rest upon a driveway to support the container above the driveway in the parked position, the restraint comprising:

a frame adapted to be coupled to the driveway, with the frame being moveable in the lateral direction;

a first axis associated with the frame;

a bottom support coupled to the frame and adapted to engage the bottom of the container;

a face stop coupled to the frame and selectively positionable to a restraining position and a release position, in the release position the face stop being adapted to accommodate delivery and removal of the swap body respectively to and from the driveway, in the restraining position the face stop being adapted to engage the front face to limit horizontal movement of the container in the first direction, the face stop being positionable to the restraining position and the release position by virtue of the frame being movable in the lateral direction; and a plug protruding downward from the frame and selectively engaging and releasing a socket of a plurality of sockets adapted to be recessed into the driveway at a corresponding plurality of locations, whereby horizontal movement of the frame relative to the driveway can be limited at the corresponding plurality of locations.

3. A restraint for limiting movement of a swap body in a parked position, the swap body having a length extending along a longitudinal direction and a width extending along a lateral direction, the swap body including a container having a front face and a rear face at opposite ends of the length and extending upwardly from a bottom of the container, the direction from the rear face to the front face defining a first direction, the swap body also including a plurality of legs coupled to the container and adapted to rest upon a driveway to support the container above the driveway in the parked position, the restraint comprising:

a frame adapted to be coupled to the driveway, with the frame being moveable in the lateral direction;

a first axis associated with the frame;

a bottom support coupled to the frame and adapted to engage the bottom of the container;

a face stop coupled to the frame and selectively positionable to a restraining position and a release position, in the release position the face stop being adapted to accommodate delivery and removal of the swap body respectively to and from the driveway, in the restraining position the face stop being adapted to engage the front face to limit horizontal movement of the container in the first direction, the face stop being positionable to the restraining position and the release position by virtue of the frame being movable in the lateral direction; and a plurality of wheels coupled to the frame and adapted to move the frame across the driveway, the plurality of wheels also being selectively movable in a vertical direction relative to a lower surface of the frame to selectively fix and release the lower surface relative to the driveway.

4. A restraint for limiting movement of a swap body in a parked position, the swap body having a length extending along a longitudinal direction and a width extending along a lateral direction, the swap body including a container having a front face and a rear face at opposite ends of the length and extending upwardly from a bottom of the container, the direction from the rear face to the front face defining a first direction, the swap body also including a plurality of legs coupled to the container and adapted to rest upon a driveway to support the container above the driveway in the parked position, the restraint comprising:

a frame adapted to be coupled to the driveway;

a face stop coupled to the frame and being selectively positionable to a restraining position and a release position, in the release position the face stop being adapted to accommodate delivery and removal of the swap body respectively to and from the driveway, in the restraining position the face stop being adapted to engage the front face to limit movement of the container in the first direction, wherein the frame is movable in the lateral direction to laterally position the face stop between the restraining position and the release position; and a plug protruding downward from the frame and selectively engaging and releasing a socket of a plurality of sockets adapted to be recessed into the driveway at a corresponding plurality of locations, whereby movement of the frame relative to the driveway can be limited at the corresponding plurality of locations.

5. A restraint for limiting movement of a swap body in a parked position, the swap body having a length extending along a longitudinal direction and a width extending along a lateral direction, the swap body including a container having a front face and a rear face at opposite ends of the length and extending upwardly from a bottom of the container, the direction from the rear face to the front face defining a first direction, the swap body also including a plurality of legs coupled to the container and adapted to rest upon a driveway to support the container above the driveway in the parked position, the restraint comprising:

a frame adapted to be coupled to the driveway;

a face stop coupled to the frame and being selectively positionable to a restraining position and a release position, in the release position the face stop being adapted to accommodate delivery and removal of the swap body respectively to and from the driveway, in the restraining position the face stop being adapted to engage the front face to limit movement of the container in the first direction, wherein the frame is movable in the lateral direction to laterally position the face stop between the restraining position and the release position; and a plurality of wheels coupled to the frame and adapted to move the frame across the driveway, the plurality of wheels also being selectively movable in a vertical direction relative to a lower surface of the frame to selectively fix and release the lower surface relative to the driveway.

6. A restraint for limiting movement of a swap body in a parked position, the swap body having a length extending along a longitudinal direction and a width extending along a lateral direction, the swap body including a container having a front face and a rear face at opposite ends of the length and extending upwardly from a bottom of the container, the direction from the rear face to the front face defining a first direction, the swap body also including a plurality of legs coupled to the container and adapted to rest upon a driveway to support the container above the driveway in the parked position, the restraint comprising:

a frame adapted to be coupled to the driveway;

a face stop coupled to the frame by way of a moveable assembly and being selectively positionable to a restraining position and a release position, in the release position the face stop being adapted to accommodate delivery and removal of the swap body respectively to and from the driveway, in the restraining position the face stop being adapted to engage the front farce to limit movement of the container in the first direction;

a bottom support coupled to the frame and adapted to engage the bottom of the container when the face stop is in the restraining position; and a fine adjustment that moves the face stop in relation to the bottom support.

* * * * *

UNITED STATES PATENT AND TRADEMARK OFFICE
CERTIFICATE OF CORRECTION

PATENT NO.     : 6,520,472 B1
DATED          : February 18, 2003
INVENTOR(S)    : Glenn R. Manich et al.

It is certified that error appears in the above-identified patent and that said Letters Patent is hereby corrected as shown below:

<u>Column 8,</u>
Line 50, please delete "farce to" and add -- face to --.

Signed and Sealed this

Fourth Day of November, 2003

JAMES E. ROGAN
*Director of the United States Patent and Trademark Office*